(No Model.)
J. S. FREESE.
FRICTION CLUTCH.
No. 559,972. Patented May 12, 1896.
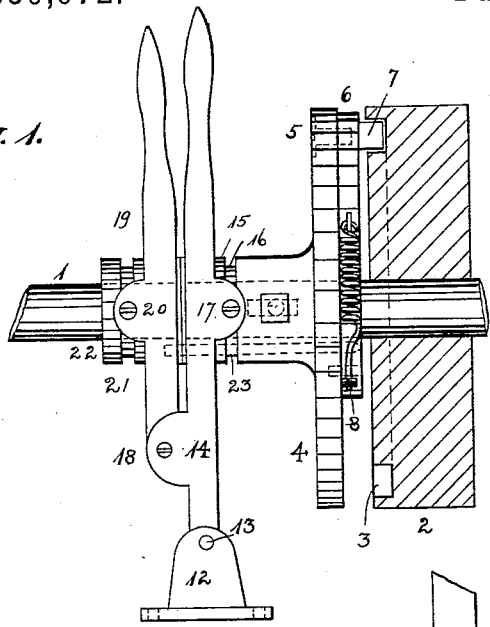
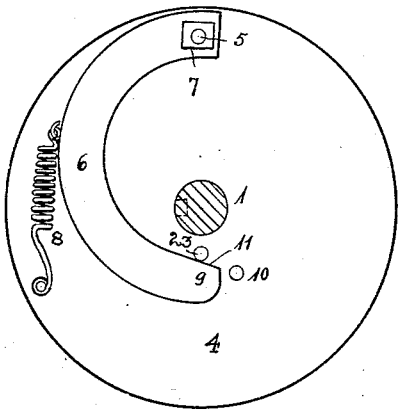
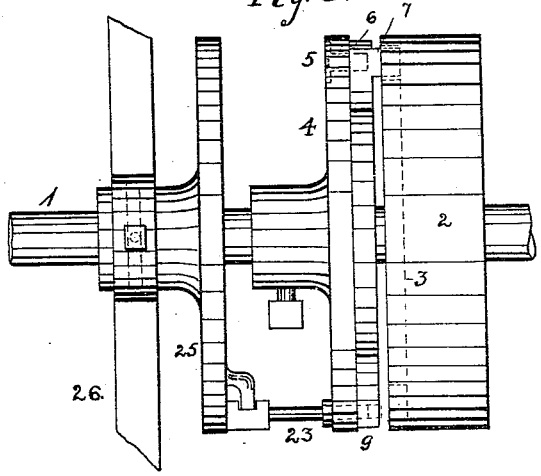
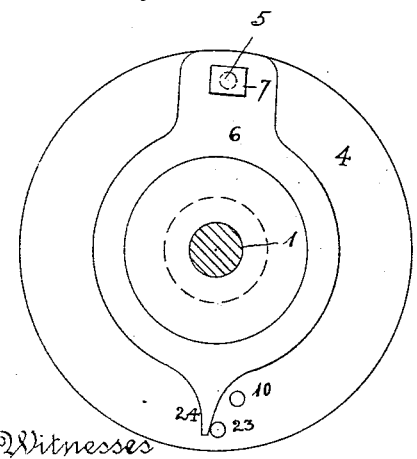
Witnesses
Louis Berger.
Geo. J. Stocks.
John S. Freese, Inventor
By his Attorney A. M. Pierce.
ANDREW B.GRAHAM, PHOTO-LITHO. WASHINGTON, D.C.

UNITED STATES PATENT OFFICE.

JOHN S. FREESE, OF BROOKLYN, NEW YORK.

FRICTION-CLUTCH.

SPECIFICATION forming part of Letters Patent No. 559,972, dated May 12, 1896.

Application filed February 14, 1896. Serial No. 579,216. (No model.)

*To all whom it may concern:*

Be it known that I, JOHN S. FREESE, a citizen of the United States, residing in Brooklyn, Kings county, State of New York, have invented a new and useful Improvement in Friction-Clutches, of which the following is a specification.

My invention relates especially to that class of clutches designed for coupling driving-shafts of machinery, particularly where the said machinery is heavy and must be started gradually to prevent undue strain or jar, and has for its object the provision of a clutch simple in construction and effective in operation.

To attain the desired end, my invention consists, essentially, in certain novel and useful combinations or arrangements of parts and peculiarities of construction and operation, all of which will be hereinafter first fully described, and then pointed out in the claims.

In the accompanying drawings, forming a part hereof, Figure 1 is a side view and partial vertical section of my improved friction-clutch designed for use upon the floor. Fig. 2 is a face view looking from the right of Fig. 1, the grooved plate being removed. Fig. 3 is a side elevation of the clutch as adapted for overhead use. Fig. 4 is a face view looking from the right of Fig. 3 with the grooved plate removed.

Similar numerals of reference, wherever they occur, indicate corresponding parts in all the figures.

1 is the driving-shaft, connected to any mechanism to which it is desired to impart motion.

2 is a pulley or band-wheel loosely mounted upon said shaft and having a groove 3 in its face.

4 is a disk or plate mounted upon the shaft 1 so as to slide longitudinally thereon, but revolve therewith when the clutch is in engagement.

5 is a screw or pin upon which is pivoted a rocking arm 6, said pin 5 passing through the arm and a friction-block 7, fixed thereon, this block fitting into the groove 3 in the pulley 2 in such a manner as to permit the free rotation of the pulley upon the shaft 1 or to engage with the walls of the groove when the clutch is brought into play, as will be hereinafter set forth.

8 is a spring which normally holds the free extremity 9 of the arm 6 against a stop-pin 10, fixed in the plate 4, this position throwing the block 7 to such a position as to be entirely free from the walls of the groove 3. The inner edge of the free extremity of the arm 6 is beveled at 11.

12 is a standard for securing to the floor or in any other convenient position, and 13 is a pivot therein wherewith engages a lever 14, passing to a loose collar 15, through which the shaft passes, said collar being secured to the hub of the disk 4. The collar 15 has a circumferential groove 16, into which a screw or the equivalent enters from the lever 14. Pivoted at 18 to the lever 14 is a second lever 19, having a screw or pin 20, which enters a circumferential groove 21 in a second collar 22, loosely mounted upon the shaft 1. Extending from the collar 22 through a perforation in the collar 15 and the disk 4 is a pin 23, the free end of which is pointed or conical.

The operation of my improved clutch is as follows: Rotation being given to the pulley 2, it moves freely upon the shaft 1, the two levers 14 and 19 being pushed to the left, withdrawing the clutch mechanism from the pulley. If it is desired to bring the clutch into action, the lever 14 is pushed to the right, carrying the friction-block 7 into the groove 3 in the pulley 4, and then by applying the same movement to the lever 19 the pin 23 is forced to the right, the conical extremity thereof impinging against the beveled portion 9 of the arm 6, rocking it to the left upon the pin 5, turning the block 7 slightly across the groove 3, causing it to engage with the walls of the groove, locking the parts together by the friction.

In the modification illustrated in Figs. 3 and 4 the arm 6 is shown as a ring provided with a projection 24, against which the pin 23 impinges when the clutch is in operation, the said pin 23 being carried by a disk 25, which takes the place of the collar 15. 26 is a lever for moving said disk so as to cause the pin 23 to rock the arm 6, carrying the friction-block 7.

Having now fully described my invention, what I claim as new therein, and desire to secure by Letters Patent, is—

1. A friction-clutch in which is comprised a shaft a loose pulley having a groove in its side; a disk slidably mounted upon said shaft at the side of the grooved pulley and arranged to revolve therewith; a rocking arm mounted upon said disk and carrying a friction-block which enters the groove in the pulley, and a pin adapted to rock the arm, causing the friction-block to engage with both of the walls of the groove in the pulley, substantially as shown and described.

2. In a friction-clutch of the character herein specified, the combination with a pulley having a groove in its side face, of a friction-block, mounted upon a pivot and entering said groove, and means for rocking said block upon its pivot so as to engage with both walls of the groove, substantially as shown and described.

3. In a friction-clutch, the combination with a grooved pulley, arranged as set forth, of a disk mounted at the side of the pulley, and carrying a rocking arm bearing a friction-block which enters the groove in the pulley, being normally held out of engagement with the walls of the groove, and a movable pin for rocking the lever and block substantially as shown and described.

4. In a friction-clutch of the character herein specified, the combination with a pulley having an annular groove in its side face, of a friction-block mounted upon a pivot and entering said groove; means for rocking the block upon its pivot, and for moving the block into and out of said groove, substantially as shown and described.

JOHN S. FREESE.

Witnesses:
JOHN H. SCHEIDT,
A. M. PIERCE.